United States Patent
Yang et al.

(10) Patent No.: US 7,888,835 B2
(45) Date of Patent: Feb. 15, 2011

(54) ROTATING SHAFT AND MOTOR ROTOR HAVING THE SAME

(75) Inventors: Shih-Jen Yang, Taipei (TW); Hung-Sen Tu, Taipei (TW); I-Hsing Chen, Taipei (TW); Chen-Cha Yang, Taipei (TW)

(73) Assignee: System General Corporation, Taipei (TW)

( * ) Notice: Subject to any disclaimer, the term of this patent is extended or adjusted under 35 U.S.C. 154(b) by 0 days.

(21) Appl. No.: 11/906,274

(22) Filed: Oct. 1, 2007

(65) Prior Publication Data

US 2009/0015091 A1    Jan. 15, 2009

(30) Foreign Application Priority Data

Jul. 13, 2007    (TW) ............... 96125513 A

(51) Int. Cl.
*H02K 1/28* (2006.01)
(52) U.S. Cl. .............. 310/156.19; 310/156.09; 310/156.38
(58) Field of Classification Search ............ 310/156.19, 310/156.21, 154.17–19, 48, 156.48, 154.21
See application file for complete search history.

(56) References Cited

U.S. PATENT DOCUMENTS

| | | | | | |
|---|---|---|---|---|---|
| 2,060,260 | A | * | 11/1936 | Spengler | 310/156.09 |
| 2,985,779 | A | * | 5/1961 | Flaningam et al. | 310/156.19 |
| 4,588,914 | A | * | 5/1986 | Heyne | 310/156.11 |
| 4,855,630 | A | * | 8/1989 | Cole | 310/156.28 |
| 4,877,986 | A | * | 10/1989 | Shimizu | 310/153 |
| 4,954,736 | A | * | 9/1990 | Kawamoto et al. | 310/156.21 |
| 4,973,872 | A | * | 11/1990 | Dohogne | 310/156.28 |
| 5,091,668 | A | * | 2/1992 | Cuenot et al. | 310/156.61 |
| 5,237,737 | A | * | 8/1993 | Zigler et al. | 29/598 |
| 5,397,951 | A | * | 3/1995 | Uchida et al. | 310/156.21 |
| 5,828,152 | A | * | 10/1998 | Takeda et al. | 310/156.19 |
| 5,952,755 | A | * | 9/1999 | Lubas | 310/156.19 |
| 6,703,741 | B1 | * | 3/2004 | Ifrim | 310/156.19 |
| 6,707,206 | B2 | * | 3/2004 | Chang | 310/156.08 |
| 6,734,596 | B1 | * | 5/2004 | Liao | 310/261.1 |
| 6,750,580 | B2 | * | 6/2004 | Lai et al. | 310/156.28 |
| 6,940,199 | B2 | * | 9/2005 | Imamura et al. | 310/156.48 |
| 7,285,890 | B2 | * | 10/2007 | Jones et al. | 310/156.19 |

FOREIGN PATENT DOCUMENTS

| | | | |
|---|---|---|---|
| JP | 02084032 A | * | 3/1990 |
| TW | 412100 | | 11/2000 |
| TW | 595072 | | 6/2004 |

* cited by examiner

*Primary Examiner*—Quyen Leung
*Assistant Examiner*—Naishadh N Desai
(74) *Attorney, Agent, or Firm*—Berliner & Associates

(57) ABSTRACT

A rotating shaft disclosed by the present invention includes a plurality of bumps spacedly formed along an outer circumferential surface thereof. The bumps are each formed with two engagement portions extending outwardly and bilaterally and a deformation space therebetween. The engagement portions undergo resilient deformation toward the deformation space when subjected to a force, thus providing stable engagement with a magnetic body, protecting the magnetic body from cracks and damages during assembling, and enhancing yield. The present invention further discloses a motor rotor having the above-described rotating shaft.

20 Claims, 4 Drawing Sheets

ROTATING SHAFT AND MOTOR ROTOR HAVING THE SAME

BACKGROUND OF THE INVENTION

1. Field of the Invention

The present invention relates generally to a motor rotor, and more particularly to a motor rotor and rotating shaft thereof having engagement structure for fixing magnetic bodies to the rotating shaft.

2. Description of Related Art

A motor (electromotor) is used to convert electrical energy into mechanical energy so as to provide rotary motion. Besides directly providing rotary motion, the motor also can convert rotary mechanical energy into linear motion or vibrating motion by combining with different mechanisms.

A motor for providing rotary motion comprises a stator and a rotor, wherein the stator is the stationary part of the motor, which provides a magnetic field; the rotor is the rotary part of the motor, which rotates according to the magnetic field. The rotor generally comprises a rotating shaft formed by stacking a plurality of silicon steel sheets and a plurality of permanent magnets spacedly adhered to an outer circumferential surface of the rotating shaft. As the permanent magnets are fixed to the rotating shaft by adhering, the permanent magnets can easily be adversely affected by external environment factors and detached from the rotating shaft, thus inevitably disturbing normal operation of the motor rotor and even causing the rotor to be stuck in the stator.

The above-described environment factors can be, but not limited to, temperature and humidity. If the surrounding temperature around the motor greatly changes (for example, the motor operates in a cold area below zero degree), delamination can occur due to different thermal expansion coefficients between the permanent magnets and the silicon steel sheets. On the other hand, if the humidity around the motor greatly changes (for example, the motor operates in a humid area or in water), the silicon steel sheets gradually gather rust and the rust further presses the adhesive layer (the cured adhesive), thereby causing delamination to occur. Therefore, the above-describe environment factors directly shorten the lifetime of the motor. How to prevent the environment factors from adversely affecting the lifetime of the motor has become important.

In order to overcome the above-described lifetime shortening problem caused by the adhering method, engagement structures for assembling the permanent magnets to the rotating shaft are proposed. Typically, a plurality of engagement grooves spaced apart with an equal interval is disposed on an outer circumferential surface of the rotating shaft for engaging with the permanent magnets, wherein clearance generated during assembly is helpful to overcome delamination caused by environment factors. However, as the silicon steel sheets and the permanent magnets are fabricated by different techniques having different precisions, great variation can occur during assembly engagement, which often leads to cracking of the crisp permanent magnets when the magnets are engaged with the engagement grooves, thus seriously affecting the assembly yield.

FIG. 1 is a structural diagram of a motor rotor 1 disclosed by Taiwan Patent No. 412,100. As shown in FIG. 1, the motor rotor 1 comprises a plurality of silicon steel sheets 11, a plurality of permanent magnets 13, a plurality of bolts 15, and two end covering plates 17. The plurality of silicon steel sheets 11 is stacked so as to form a rotating shaft. A plurality of fixing grooves 111 is formed along an outer circumferential surface of each silicon steel sheet 11 and spaced apart with an equal interval such that the bolts 15 can be inserted and fixed therein, thereby fixing the plurality of permanent magnets 13 to the outer circumferential surface of the rotating shaft. That is, the permanent magnets 13 are each embedded between two adjacent bolts 15. The end covering plates 17 disposed at two ends of the rotating shaft are used to fix the permanent magnets 13 and the bolts 15 to the rotating shaft and prevent them from detaching from the two ends of the rotating shaft.

As the above-described invention uses additional elements such as the bolts 15 and the two end covering plates 17, the element cost, the assembly cost and the warehousing cost are increased. Further, because the punching precision of the grooves 111 and the machining precision of the permanent magnets 13 have a difference of at least onefold, the assembly precision is not easy to control. Accordingly, the grooves and the permanent magnets can have clearance fit or interference fit. If the interference fit appears, when the bolts 15 are inserted to the fixing grooves, the bolts 15 can press the permanent magnets 13 so as to cause the permanent magnets 13 to crack, thereby significantly affecting the fabrication yield and greatly increasing the fabrication cost.

FIG. 2 is structural diagram of a motor rotor 2 disclosed by Taiwan Patent No. 595072. As shown in FIG. 2, the motor rotor 2 comprises a rotating shaft 21, a plurality of permanent magnets 23 and embedding teeth 25. The rotating shaft 21 is integrally formed by silicon steel and a plurality of embedding bumps 211 is spacedly formed along an outer circumferential surface of the rotating shaft 21. Each permanent magnet 23 is disposed to the outer circumferential surface of the rotating shaft 21 at a position between two adjacent embedding bumps 211, and the embedding teeth 25, each of which has grooves corresponding to the embedding bump 211, are engaged with the embedding bumps 211 such that the permanent magnets 23 can be fixed by adjacent embedding teeth 25.

However, as the above-described teeth 25 should be fabricated according to the shape and size of the permanent magnets 23 and the grooves of the embedding teeth 25 should be fabricated according to the shape and size of the embedding bumps 211, the requirement on fabrication precision is high. Also, the large number of the embedding teeth 25 leads to high element cost, high assembly cost and high warehousing cost. In addition, as the embedding teeth 25 and the permanent magnets 23 must be closely attached with each other so as to ensure a wanted fixing effect, the fabrication error can form a continuous accumulating error, which can easily cause vibration and loosening of the permanent magnets 23, especially when affected by the above-described environment factors.

Therefore, there is a need to provide a rotating shaft and a motor rotor having the same so as to overcome the above-described drawbacks.

SUMMARY OF THE INVENTION

Accordingly, an objective of the present invention to provide a rotating shaft and a motor rotor having the same so as to firmly fix the magnetic bodies to the rotating shaft.

Another objective of the present invention is to provide a rotating shaft and a motor rotor having the same, which have simplified structure and decreased elements.

A further objective of the present invention is to provide a rotating shaft and a motor rotor having the same, which is easy to assemble and can reduce assembly cost.

Still another objective of the present invention is to provide a rotating shaft and a motor rotor having the same, which can avoid cracks and damages of the magnetic bodies during assembly and increase the assembly yield.

A further objective of the present invention is to provide a rotating shaft and a motor rotor having the same, which can prevent external factors from adversely affecting the lifetime of the motor rotor.

In order to attain the above and other objectives, the present invention provides a rotating shaft having a plurality of bumps spacedly formed along an outer circumferential surface thereof such that magnetic bodies can be embedded between adjacent bumps, the rotating shaft is characterized in that: the bumps are each formed with two engagement portions extending outwardly and bilaterally and a deformation space between the engagement portions, the engagement portions undergo resilient deformation toward the deformation space when subjected to a force.

In the above-described rotating shaft, the engagement portions respectively have an engagement inclined surface formed on an outer side thereof so as to facilitate the engagement of the magnetic bodies with the engagement portions. There is no special limitation on shape of the bumps. In one embodiment, each of the bumps has one of a Y-shaped section and a V-shaped section such that the two engagement portions can respectively be located at two side edges thereof and a deformation space can be easily formed between the two engagement portions. In another embodiment, each of the bumps has a frame sectional structure, which is in a shape selected from the group consisting of circle, ellipse and rhombus, through such a design, two engagement portions are also located at two side edges of the frame sectionals structure and a deformation space can be easily formed between the two engagement portions.

There is no special limitation on form of the rotating shaft. For example, the rotating shaft and the plurality of the bumps can be formed by stacking and bonding a plurality of metal sheets. Preferably, the metal sheets are silicon steel sheets. In addition, the rotating shaft and the plurality of the humps can also be integrally formed by metal material such as silicon steel.

The present invention further provides a motor rotor, which comprises: a rotating shaft having a plurality of bumps spacedly formed along an outer circumferential surface thereof, wherein the bumps are each formed with two engagement portions extending outwardly and bilaterally and a deformation space between the engagement portions, the engagement portions undergo resilient deformation toward the deformation space when subjected to a force; and a plurality of magnetic bodies respectively embedded between the bumps on the outer circumferential surface of the rotating shaft, two sides of each magnetic body being fixed by the engagement portions of two adjacent bumps.

In the above-described motor rotor, the engagement portions respectively have an engagement inclined surface formed on an outer side thereof and each of the magnetic bodies has inclined guiding surfaces respectively disposed at two sides thereof for engaging with the engagement inclined surfaces. There is no special limitation on shape of the bumps. In one embodiment, each of the bumps has one of a Y-shaped section and a V-shaped section such that the two engagement portions are respectively located at two side edges thereof and a deformation space can be easily formed between the two engagement portions. In another embodiment, each of the bumps has a frame sectional structure, which is in a shape selected from the group consisting of circle, ellipse and rhombus, through such a design, two engagement portions are also located at two side edges of the frame sectionals structure and a deformation space can be easily formed between the two engagement portions.

According to the present invention, the bumps formed on an outer circumferential surface of a rotating shaft allow the magnetic bodies to be directly embedded therebetween without the need of other elements except necessary elements such as the rotating shaft and the magnetic bodies. Compared with the prior art, the present invention has simplified structure and decreases the number of elements to be used. Meanwhile, as the assembling operation only comprises embedding the magnetic bodies between adjacent engagement portions, the assembling operation is simplified and accordingly the assembly cost is decreased. Further, the design of the deformation space between the two engagement portions of each bump allows the engagement portions to undergo resilient deformation toward the deformation space during assembly of the magnetic bodies, thus preventing cracks and damages of the magnetic bodies and improving the assembly yield. Moreover, the resilient deformation can reduce or absorb size changes caused by external environment, thereby firmly fixing the magnetic bodies and preventing detaching of the magnetic bodies from the rotating shaft and prolonging the lifetime of the motor rotor.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Figure 1:
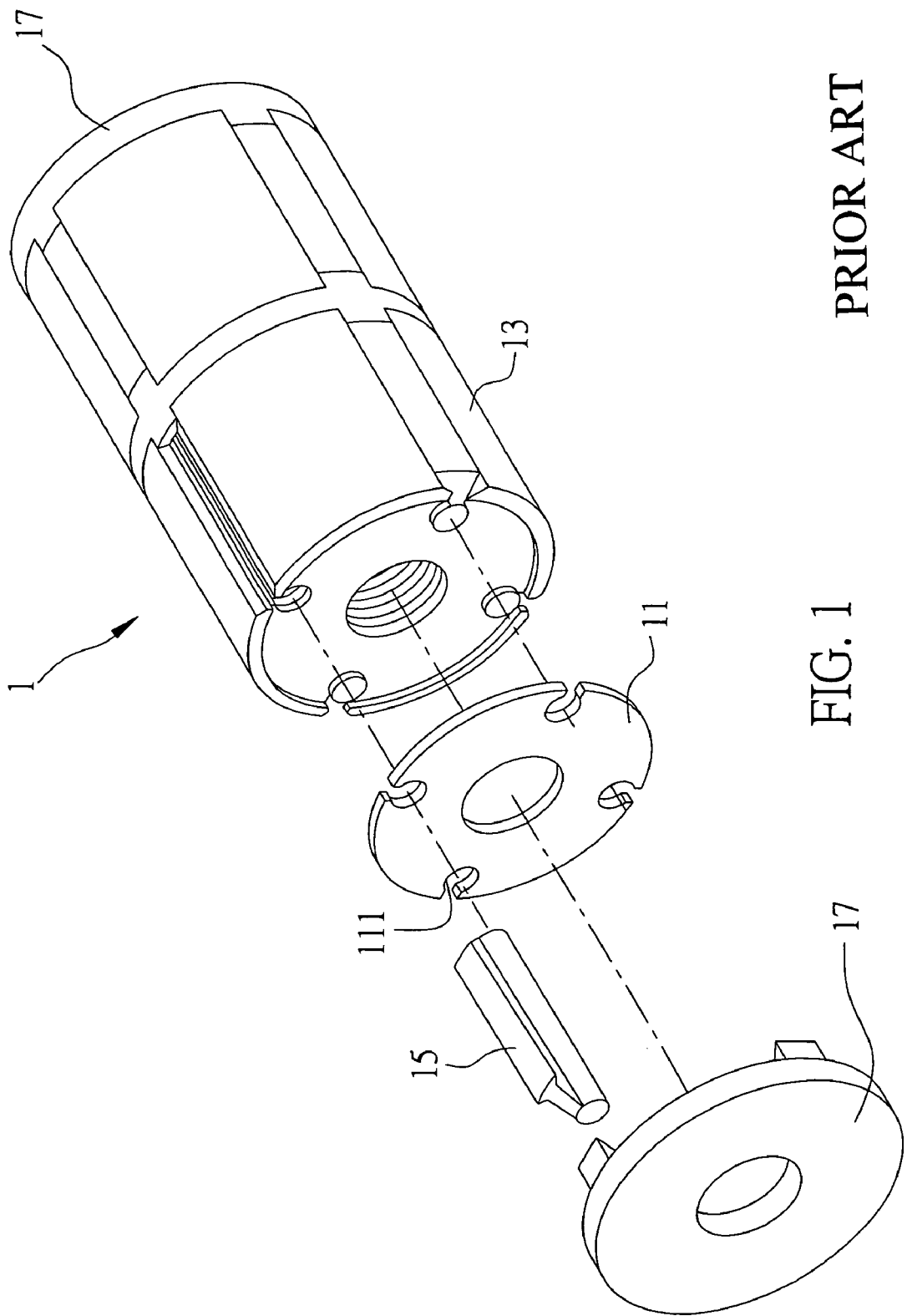
FIG. 1 is a structural diagram of a motor rotor disclosed by Taiwan Patent No. 412,100.
Figure 2:
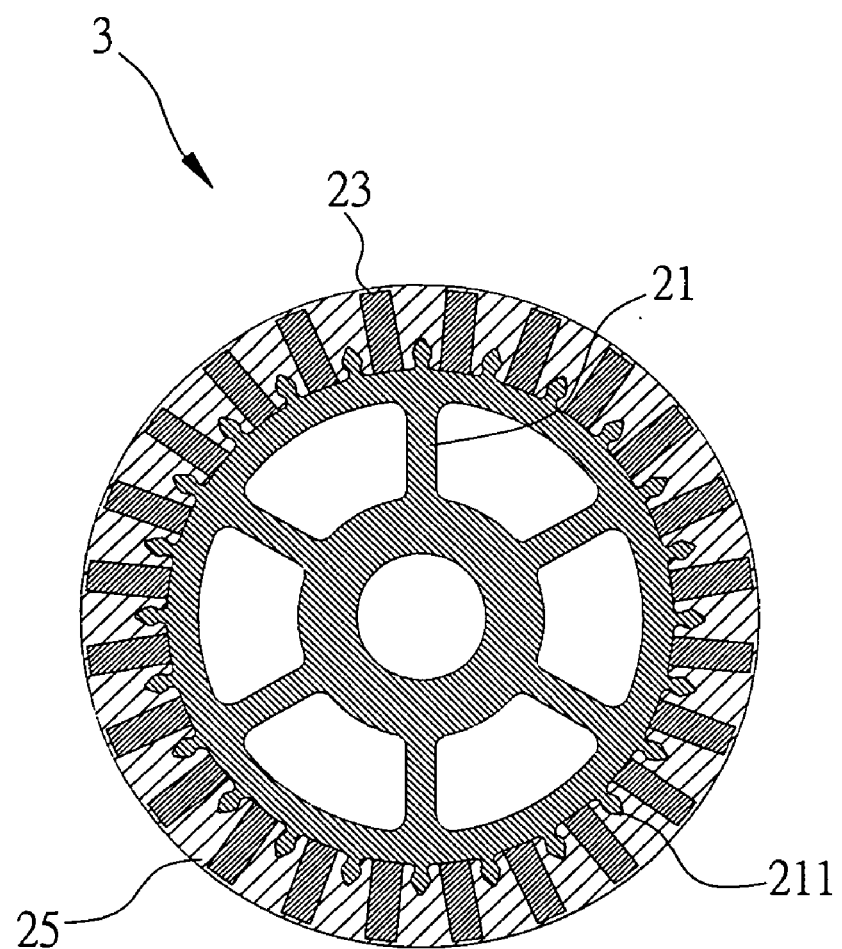
FIG. 2 is a structural diagram of a motor rotor disclosed by Taiwan Patent No. 595,072.
Figure 3A:
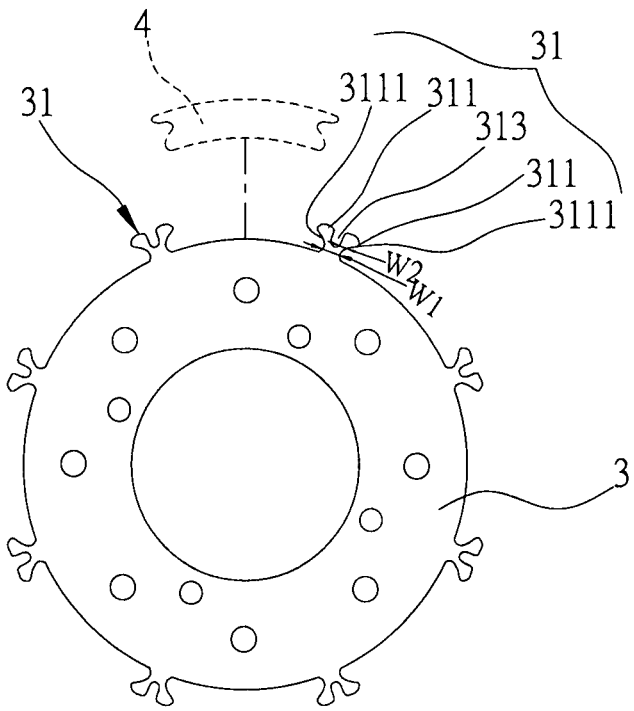
FIG. 3A is a structural diagram of a rotating shaft according to a preferred embodiment of the present invention.
Figure 3B:
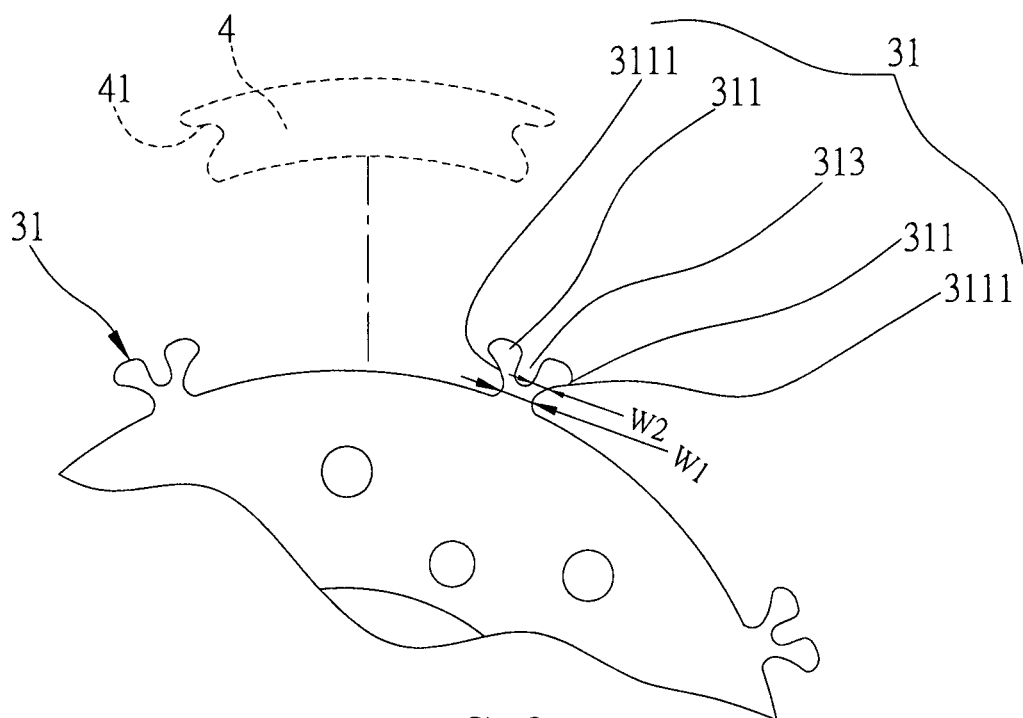
FIG. 3B is a locally enlarged view of FIG. 3A.

FIG. 3A is a structural diagram of a rotating shaft according to a preferred embodiment of the present invention and FIG. 3B is a locally enlarged view of FIG. 3A. As shown in FIGS. 3A and 3B, the rotating shaft 3 of the present invention has a plurality of bumps 31 spacedly formed along an outer circumferential surface thereof such that magnetic bodies 4 can be embedded between adjacent bumps 31, wherein, the bumps 31 are each formed with two engagement portions 311 extending outwardly and bilaterally and a deformation space 313 between the engagement portions 311, the engagement portions 311 can undergo resilient deformation toward the deformation space 313 when subjected to a force.

In the present embodiment, the rotating shaft 3 and the plurality of bumps 31 thereof can be formed by stacking and bonding a plurality of metal sheets. Generally, the metal sheets are silicon steel sheets, but it is not limited thereto. Since the technique of forming the rotating shaft 3 by stacking and bonding the silicon steel sheets is well understood by those skilled in the art and not a main characteristic of the present invention, detailed description thereof is omitted. Meanwhile, there is no special limitation on form of the rotating shaft 3. For example, the rotating shaft 3 and the plurality of bumps 31 can alternatively be integrally formed by a metal material such as silicon steel.

The engagement portions 311 respectively have an engagement inclined surface 311 formed on an outer side thereof for facilitating embedding of the magnetic bodies 4. There is no special limitation on shape of the bumps 31. In the present embodiment, the bumps 31 have a Y-shaped section, which allows the two engagement portions 311 to be respectively located at two side edges of each bump 31 and the deformation space 313 to be easily formed between the two engagement portions 311. Preferably, the bottom of the bumps 31 has a width W1 bigger than width W2 of the bottom of the engagement portions 311, thereby ensuring only the engagement portions 311 instead of the whole bumps 31 undergo resilient deformation when subjected to a force.

However, the deformation space 313 formed between two engagement portions 311 is not limited to the Y-shaped section of the present embodiment, other similar section design also can attain the same effect as the present embodiment. For example, the bumps 31 can have a V-shaped section. The V-shaped section and the Y-shaped section are only different in height. The bumps having the V-shaped section can be well understood and easily practiced by those skilled in the art, detailed description of which is omitted.

In other embodiment, the bumps 31 can respectively have a frame sectional structure, that is, the tops of the two engagement portions 311 of each bump 31 are connected together to form a frame. The shape of the frame sectional structure can be a circle, an ellipse or a rhombus, wherein the two engagement portions 311 of each bump 31 are located at two side edges of the frame sectional structure and a deformation space 313 is easily formed between the engagement portions 311.

According to the rotating shaft 3 of present invention, as a deformation space 313 is formed between the two engagement portions 311 of each bump 31, when a magnetic body 4 is embedded between adjacent bumps, the engagement portions 311 subjected to force undergo resilient deformation (contracting resilient deformation or expanding resilient deformation) toward the deformation space 313, which thus can prevent crack or damage of the magnetic body 4 during assembly and meanwhile can absorb deformation caused by external factors so as to stably embed the magnetic body 4 between the bumps 31 and prolong lifetime of the magnetic body 4.

Figure 4:
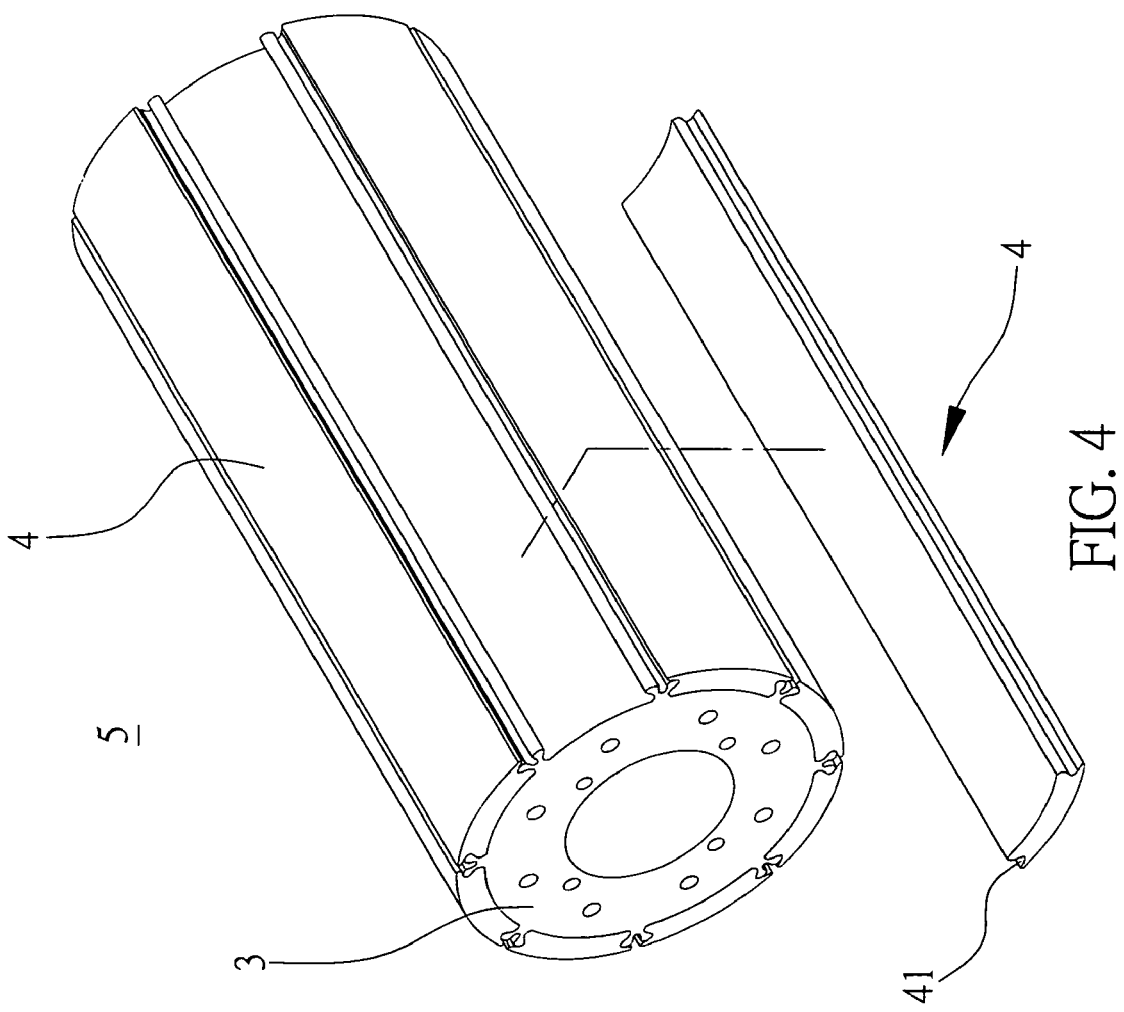
FIG. 4 is a structural diagram of a motor rotator according to the present invention.

FIG. 4 is a structural diagram of a motor rotor according to a preferred embodiment of the present invention. As shown in FIG. 4, the motor rotor 5 comprises a rotating shaft 3 and a plurality of magnetic bodies 4. Therein, referring to FIG. 3A, the rotating shaft 3 has a plurality of bumps 31 spacedly formed along an outer circumferential surface of the rotating shaft 3, and the bumps 31 are each formed with two engagement portions 311 extending outwardly and bilaterally and a deformation space 313 between the engagement portions 311, the engagement portions 311 can undergo resilient deformation toward the deformation space 313 when subjected to a force. The magnetic bodies 4 are respectively embedded between adjacent bumps 31 along the outer circumferential surface of the rotating shaft 3 and two sides of each magnetic body 4 are fixed by the engagement portions 311 of two adjacent bumps 31. In the present embodiment, the magnetic bodies 4 are permanent magnets and have an arc-shaped sheet structure corresponding to the outer circumferential surface of the rotating shaft 3, but they are not limited thereto.

In the present embodiment, the rotating shaft 3 and the plurality of bumps 31 are formed by stacking and bonding a plurality of metal sheets as described above. Alternatively, the rotating shaft 3 and the plurality of bumps 31 can be integrally formed. Similarly, the bumps 31 can have Y-shaped section or V-shaped section, or have a frame sectional structure in a shape of circle, ellipse or rhombus.

The engagement portions 311 respectively have an engagement inclined surface 3111 formed on an outer side thereof and each magnetic body 4 has corresponding inclined guiding surfaces 41 disposed at two sides thereof for engaging with the engagement inclined surfaces 3111. The design of the engagement inclined surfaces 3111 and the inclined guiding surfaces 41 can provide a preferred surface contact effect so as to increase the interactive force therebetween. But it should be noted that the design of the surfaces is not limited to the inclined surfaces. Instead, the surfaces can be arc-shaped surfaces, which also can attain a preferred surface contact effect.

The present invention makes the magnetic bodies 4 directly embedded between the bumps 31 formed on the outer circumferential surface of the rotating shaft 3, thus, the present invention eliminates the need of any additional element except necessary elements such as the rotating shaft 3 and the magnetic bodies 4. Compared with the prior art, the present invention has simplified structure and decreases the number of elements. Meanwhile, as the assembling operation only comprises embedding the magnetic bodies 4 between adjacent engagement portions 311, the assembling operation is simplified and accordingly the assembly cost is decreased.

Further, the design of the deformation space 313 between the two engagement portions 311 of each bump 31 allows the engagement portions 311 to undergo resilient deformation toward the deformation space 311 when subjected to a force during assembly of a magnetic body 4, thus preventing cracks and damages of the magnetic body 4 and improving the assembly yield. Meanwhile, through the design of the deformation space 313, a buffer effect can be provided or external squeezing or impulsion force can be absorbed no matter it is the clearance fit, or the interference fit that exists between the rotating shaft 3 and the magnetic body 4, thereby efficiently protecting the magnetic bodies 4 from being cracked or damaged.

Moreover, size change caused by humidity or temperature of external environment can be absorbed by the resilient deformation of the engagement portions 311 of the bumps 31, thereby stably fixing the magnetic bodies and preventing detaching of the magnetic bodies from the rotating shaft 3 and prolonging the lifetime of the motor rotor.

Therefore, the bumps formed on an outer circumferential surface of a rotating shaft according to the present invention allow the magnetic bodies to be directly embedded therebetween without the need of any additional element. Compared with the prior art, the present invention has simplified structure and decreases the number of elements to be used. Meanwhile, as the assembling operation only comprises embedding the magnetic bodies between adjacent engagement portions, the assembling operation is simplified and accordingly the assembly cost is decreased. Further, the design of the deformation space between the two engagement portions of each bump allows the engagement portions to undergo resilient deformation toward the deformation space during assembly of the magnetic bodies, thus preventing crack and damage of the magnetic bodies and improving the assembly yield. Moreover, the resilient deformation can reduce or absorb size change caused by external environment, thereby firmly fixing the magnetic bodies and preventing detaching of the magnetic bodies from the rotating shaft and prolonging the lifetime of the motor rotor.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A rotating shaft having a plurality of bumps spacedly formed along an outer circumferential surface thereof such that magnetic bodies can be embedded between adjacent bumps, the rotating shaft being characterized in that:

the bumps are each formed with two engagement portions extending outwardly and bilaterally and with a deformation space between the engagement portions, the engagement portions undergoing resilient deformation toward the deformation space when subjected to a force, wherein each of the bumps has a frame sectional structure, the tops of the two engagement portions of each of the bumps are connected together to form the frame sectional structure, wherein the bottoms of the two engagement portions of each of the bumps are connected together over the outer circumferential surface, and the two engagement portions are respectively located ay two side edges thereof, wherein recesses are formed on a center section of two sides of each of the magnetic bodies for engaging with the engagement portions to provide a clamping force.

2. The rotating shaft of claim 1, wherein the engagement portions respectively have an engagement inclined surface formed on an outer side thereof.

3. The rotating shaft of claim 1, wherein the outer circumferential surface is round and the bumps are formed over the round outer circumferential surface.

4. The rotating shaft of claim 1, wherein the frame sectional structure is in a shape selected from the group consisting of an ellipse and a rhombus.

5. The rotating shaft of claim 1, wherein the rotating shaft and the plurality of bumps are formed by stacking and bonding a plurality of metal sheets.

6. The rotating shaft of claim 5, wherein the metal sheets are silicon steel sheets.

7. The rotating shaft of claim 1, wherein the rotating shaft and the plurality of bumps are integrally formed by a metal material.

8. The rotating shaft of claim 7, wherein the metal material is silicon steel.

9. A motor rotor, comprising:

a rotating shaft having a plurality of bumps spacedly formed along an outer circumferential surface thereof, wherein the bumps are each formed with two engagement portions extending outwardly and bilaterally and with a deformation space between the engagement portions, the engagement portions undergoing resilient deformation toward the deformation space when subjected to a force, wherein each of the bumps has a frame sectional structure, the tops of the two engagement portions of each of the bumps are connected together to form the frame sectional structure, wherein the bottoms of the two engagement portions of each of the bumps are connected together over the outer circumferential surface, and the two engagement portions are respectively located at two side edges thereof; and a plurality of magnetic bodies respectively embedded between the bumps on the outer circumferential surface of the rotating shaft, two sides of each magnetic body being fixed by the engagement portions of two adjacent bumps, and recesses being formed on a center section of two sides of each of the magnetic bodies for engaging with the engagement portions to provide a clamping force.

10. The motor rotor of claim 9, wherein the engagement portions respectively have an engagement inclined surface formed on an outer side thereof.

11. The motor rotor of claim 9, wherein the outer circumferential surface is round and the bumps are formed over the round outer circumferential surface.

12. The motor rotor of claim 9, wherein the frame sectional structure is in a shape selected from the group consisting of an ellipse and a rhombus.

13. The motor rotor of claim 9, wherein the rotating shaft and the plurality of bumps are formed by stacking and bonding a plurality of metal sheets.

14. The motor rotor of claim 13, wherein the metal sheets are silicon steel sheets.

15. The motor rotor of claim 9, wherein the rotating shaft and the plurality of bumps are integrally formed of a metal material.

16. The motor rotor of claim 15, wherein the metal material is silicon steel.

17. The motor rotor of claim 9, wherein the magnetic bodies are permanent magnets.

18. The motor rotor of claim 9, wherein the magnetic bodies have arc-shaped sheet structure corresponding to the outer circumferential surface of the rotating shaft.

19. The motor shaft of claim 3, wherein the bumps have a bottom width larger than a bottom width of the engagement portions.

20. The motor rotor of claim 11, wherein the bumps have a bottom width larger than a bottom width of the engagement portions.